(12) United States Patent
Yu et al.

(10) Patent No.: US 8,410,185 B2
(45) Date of Patent: Apr. 2, 2013

(54) POROUS POLYMERIC MATERIALS FOR HYDROGEN STORAGE

(75) Inventors: Luping Yu, Hoffman Estates, IL (US);
Di-Jia Liu, Naperville, IL (US);
Shengwen Yuan, Chicago, IL (US);
Junbing Yang, Westmont, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/298,168

(22) Filed: Nov. 16, 2011

(65) Prior Publication Data

US 2012/0065289 A1    Mar. 15, 2012

Related U.S. Application Data

(62) Division of application No. 12/215,653, filed on Jun. 27, 2008, now Pat. No. 8,076,382.

(60) Provisional application No. 60/937,511, filed on Jun. 28, 2007.

(51) Int. Cl.
*C08G 73/02* (2006.01)
*C08J 9/228* (2006.01)

(52) U.S. Cl. ............. 521/61; 521/64; 521/77; 521/146; 502/401; 502/402

(58) Field of Classification Search ................... 521/61, 521/64, 77, 146
See application file for complete search history.

(56) References Cited

U.S. PATENT DOCUMENTS 5,710,187 A * 1/1998 Steckle et al. ................. 521/64

FOREIGN PATENT DOCUMENTS

EP      1 365 002 A1    11/2003
WO    WO 2005/123737 A2    12/2005

* cited by examiner

*Primary Examiner* — Irina S Zemel
(74) *Attorney, Agent, or Firm* — Foley & Lardner LLP

(57) ABSTRACT

A porous polymer, poly-9,9'-spirobifluorene and its derivatives for storage of $H_2$ are prepared through a chemical synthesis method. The porous polymers have high specific surface area and narrow pore size distribution. Hydrogen uptake measurements conducted for these polymers determined a higher hydrogen storage capacity at the ambient temperature over that of the benchmark materials. The method of preparing such polymers, includes oxidatively activating solids by $CO_2$/steam oxidation and supercritical water treatment.

18 Claims, 6 Drawing Sheets

POROUS POLYMERIC MATERIALS FOR HYDROGEN STORAGE

CROSS-REFERENCE TO RELATED PATENT APPLICATIONS

This application is a divisional of U.S. application Ser. No. 12/215,6534, filed Jun. 27, 2008, which claims priority from U.S. Provisional Application 60/937,511, filed Jun. 28, 2007, all of which are incorporated herein by reference in their entirety.

GOVERNMENT INTEREST

The United States Government has certain rights in this invention pursuant to Contract No. DE-AC02-06CHI1357 between the United States Department of Energy and UChicago Argonne, LLC as operator of Argonne National Laboratories.

FIELD OF THE INVENTION

The present invention relates generally to the field of hydrogen storage. In particular, certain embodiments of the present invention relate to porous polymeric materials for hydrogen storage.

BACKGROUND OF THE INVENTION

Carbon dioxide emissions generated from the combustion of fossil fuels, such as gasoline and diesel, has been attributed to causing globe warming through the well known greenhouse effect. Alternative energy carriers, such as hydrogen, are currently under development as a replacement for the traditional fossil fuels in transportation applications due to its minimum impact on the environment. On-board hydrogen storage technology represents a critical component for transportation applications for the future $H_2$-based economy. As such, the Department of Energy (DOE) has established targets necessary to make a hydrogen storage system technically and economically feasible by 2010. To meet the DOE's 2010 targets, the storage system must have a minimum gravimetric capacity of 0.06 kg $H_2/kg_{ads}$ and a volumetric capacity of 0.045 kg $H_2/L$ at ambient temperature, and the system must cost less than \$4/kWh (i.e. $dG \geq 0.06$ kg $H_2/kg_{ads}$, $dV \geq 0.045$ $k_gH_2/L$, Cost$\leq$\$8/$k_{g\_Abs}$). However, no current technology meets these goals.

At present, hydrogen storage technologies being developed include compression, metal hydrides, chemical hydrides and physisorption-based materials. Among them, physisorption-based materials, such as porous carbon, have some unique advantages. Hydrogen adsorption on an open carbon surface originates from van der Waals attraction with a low free energy of ~3.8 kJ/mol. This weak interaction enables $H_2$ molecules to physisorb on the adsorbent surface with high mobility, yet allows them to release easily with minimum energy input when needed. Metal and chemical hydrides, on the other hand, require significant energies to extract $H_2$ by breaking the chemical bonds. The carbon-based materials are also, in general, lightweight and inexpensive compared with the hydrides. The weak $H_2$ physisorption, nonetheless, also contributes to the deficiency of the carbon-based materials. The average kinetic energy of $H_2$ at ambient temperature exceeds to that of physisorption, which limits the storage capacity of open-structured materials, such as activated carbons, even if they have very high specific surface areas. An ideal carbon-based, non-dissociative adsorbent should have $H_2$ adsorption energy in the range of 10~40 kJ/mol.

However, in practice, fine-tuning the physisorption energy of $H_2$ on the carbon surface has proven very challenging. Recently, it has been demonstrated that a $H_2$ storage capacity of up to 3 wt % can be achieved on carbon single-wall nanotubes (A. C. Dillon, K. M. Jones, T. A. Bekkedahl, C. H. Kiang, D. S. Bethune, and M. J. Heben, *Nature* 386, (1997)). This finding demonstrated that relatively high $H_2$ storage can be indeed achieved through a non-dissociative processes in porous materials with narrow channel and interstitial spacing. The carbon single-walled nanotubes are fabricated via laser sublimation or arc discharge at a low yield. However, carbon single-walled nanotube are prohibitively expensive as a commercial adsorbent material.

Consequently, there is a need for a commercially feasible and highly efficient absorbent carbon based material. The commercial application of a hydrogen storage technology will require hydrogen storage materials that can be manufactured in large quantities at low cost while still possessing sufficient gravimetric and volumetric properties. One cost-effective alternative to expensive and hard to manufacture carbon single-walled carbon nanotubes is the porous polymers. Traditionally, polymers have not been viewed as viable gas adsorbents due to their densely packed intermolecular space and the lack of surface area or porosity. In 2002, it was reported in the art that a hydrogen adsorption of up to 8 wt % was achieved over acid-treated conductive polymers, such as polyaniline and polypyrrole. However, this claim was later refuted.

SUMMARY OF THE INVENTION

In one aspect, the present invention comprises use as a $H_2$ storage medium of a porous polymer tribeenzohexazatriphenylene (TBHTP) and its derivatives as created through the polymer synthesis method. These polymers have a high specific area, narrow micropore distribution, with conjugated π-electron surface and thermally stable up to 250° C. The surface area and porosity of the TBHTP and its derivatives may be enhanced using oxidative activation methods, such as supercritical water or flowing $CO_2$ or steam elevated temperatures. The hydrogen storage capacity was measured. At 77 K, the gravimetric capacity was found to be 0.017 kg $H_2/kg_{ads}$ and the volumetric capacity was found to be 0.016 Kg $H_2/L$ at hydrogen pressures of 50 bars. Hydrogen storage capacity of TBHP at ambient temperature was found to compare favorably with the hydrogen storage capacities of other materials such as single wall nanotubes, Amberlite® and carbon molecular sieve (CMS).

In another aspect, the present invention comprises the preparation and use of porous polymers synthesized through cross-linking of stereo-contorted core monomers with spiral and tetrahedral core structure to construct high specific surface areas and intrinsic narrow porosity distribution. Such core monomers include 9,9'-spirobifluorene and tetraphenyl methane. Such monomers can be further functionalized with different terminal groups such as phenylene or thiophene so that the polymer with conjugated surface or conductive backbone can be formed upon polymerization process. The polymers prepared from these groups include cross-linked 2,2',7,7'-tetraethynyl-9,9'-spirobifluorene, tetra(4-ethynylphenyl)methane, 2,2',7,7'-Tetrakis-(2-thieny)-9,9'-spirobifluoene, etc. The gravimetric hydrogen uptake capacities of these polymers range from 0.012 to 0.035 kg $H_2$/kg$_{ads}$ at liquid nitrogen temperature.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
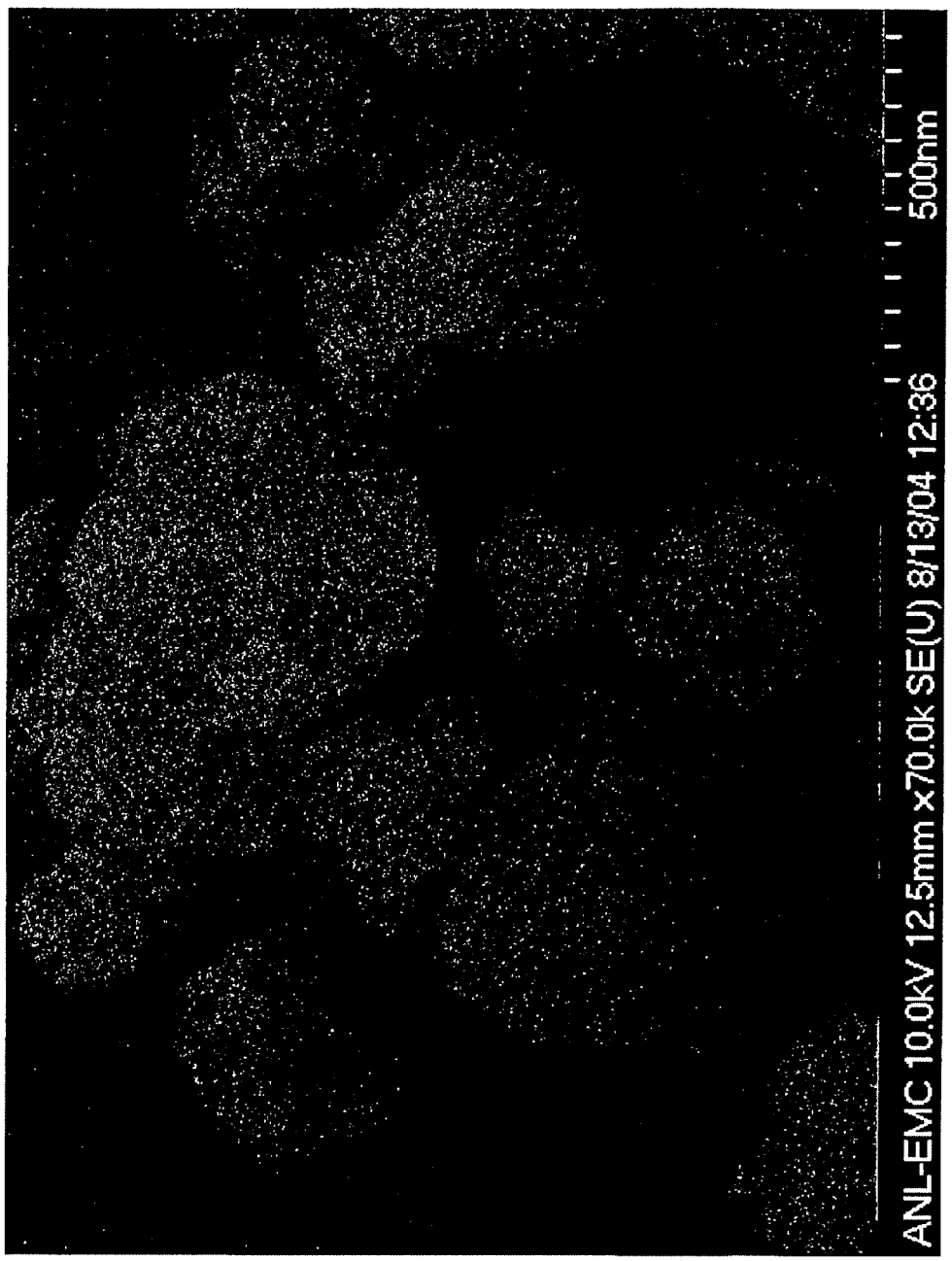
FIG. 1 is a scanning electron microscope (SEM) image of a polymer sample prepared in accordance with the embodiment described in Example 1.

In one aspect of the current invention, a nanostructured polymer system can be used as a $H_2$ adsorbent. In one embodiment, the preferred polymer system and its derivatives have the following attributes: (a) a high surface area to provide sufficient interface between $H_2$ and the adsorbent; (b) a narrow pore diameter distribution, preferably ranging from about 0.3 to about 1.0 nm, to anchor $H_2$ in the confined space through enhanced van der Waals interaction; (c) a conductive or "metallic" feature through an extended π-electron conjugation or by metal doping to promote hydrogen electron transfer and "rotational cooling" via ortho-para conversion; (d) a semi-rigid framework capable of undergoing a conformational change at ambient temperatures and elevated pressures to trap a higher level of $H_2$; and (e) stabilized through multiple thermal cycles with temperature up to about 250° C.

Another aspect of the current invention relates to methods for preparing a porous polymer tribenzohexazatriphenylene and its derivatives for the application of hydrogen storage through a polymer synthesis method. tribenzohexazatriphenylene and its derivatives have high specific surface area, narrow micro pore distribution, with conjugated π-electron surface and thermally stable up to 250° C.

Yet another aspect of the current invention relates to methods of preparing porous polymers for the application of hydrogen storage using the monomer 9,9'-spirobifluorene and its derivatives through the cross-linking reaction. The polymers thus prepared have narrow porosity distribution, high surface area and high stabilities toward the temperature and humidity, and suitable for hydrogen storage application.

Yet another aspect of the current invention relates to methods of preparing porous polymers for the application of hydrogen storage using the monomer tetraphenyl methane and its derivatives through the cross-linking reaction. The polymers thus prepared have narrow porosity distribution, high surface area and high stabilities toward the temperature and humidity, and suitable for hydrogen storage application.

Yet another aspect of the current invention is to further enhance the surface area and porosity of the tribenzohexazatriphenylene and its derivatives, poly-9,9'-spirobifluorene and its derivatives, poly-tetraphenyl methane and its derivatives using oxidative activation methods. In one embodiment, the oxidative activation method includes treating these polymers and their derivatives under the supercritical water. Another activation method can be treating these polymers and their derivatives in flowing $CO_2$ or steam at elevated temperature.

In one exemplary embodiment, the polymer systems of the present invention exhibit the following properties:
  Reversible "physisorption" with gravimetric capacities range from 0.2 to 0.8 wt. % at ambient temperature and 1.2 to 3.5 wt. % at 77 K
  High BET surface area (from 400 $M^2/g$ to 1200 $M^2/g$), narrow porosity distribution (Φ=5.2 Å to 7 Å)
  Conjugated or Conductive polymeric backbone
  Structural confirmation change during $H_2$ uptake at elevated pressure.

In one preferred embodiment, the preparation of tribenzohexazatriphenylenes involves cross-linking through condensation between hexaketocyclohexane and diaminobenzidine producing a layered porous structure with heteroatomic planes that can be characterized by Fourier transform infracted spectroscopy, thermo-gravimetric analysis (TGA) and elemental analysis. In one exemplary embodiment, tribenzohexazatriphenylene and its derivatives are prepared by polymer condensation method through the reaction of:

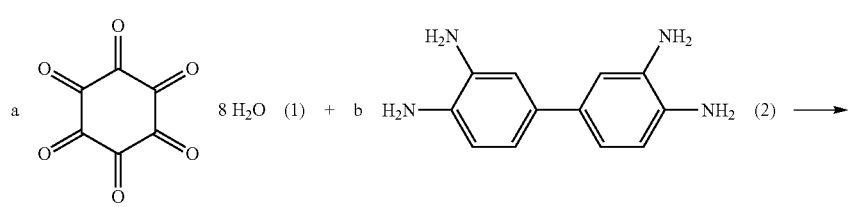

Equation (1)

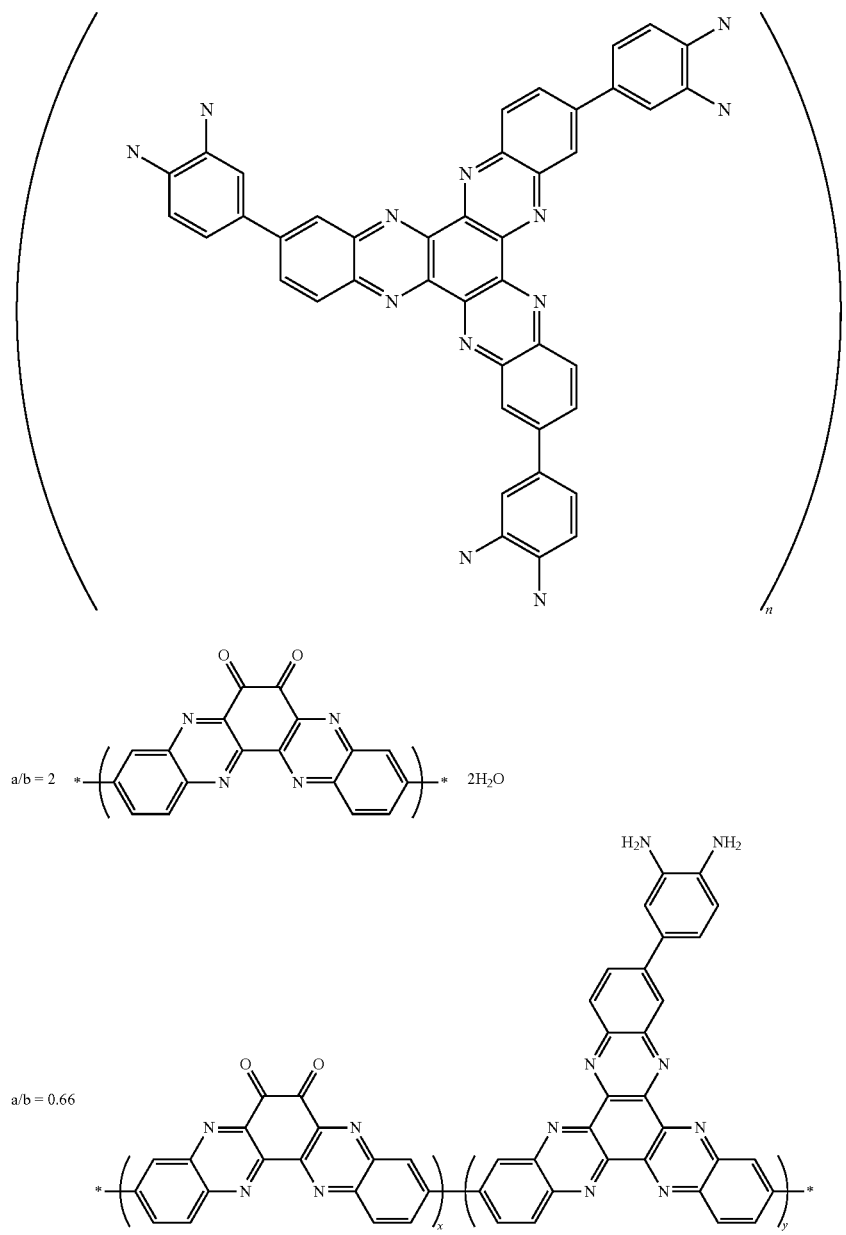

Hexaketocyclohexane octahydrate (A) ($C_6O_6 \cdot 8H_2O$) and 3,3'-diaminobenzidine (B) ($C_{12}H_{14}N_4$). Depending on the molar ratio of A/B, different derivatives of tribenzohexazatriphenylene polymer can be obtained including for example, without limitation by the theory, with ratios of A/B between about 0.2 and 3. In one embodiment, the ratio of A/B is from about 0.5 to 2 and in another embodiment from about 2 to 1.

The preparation of the material from a base polymer to a final product of a hydrogen adsorbent involves several steps. In one embodiment, the first step is the condensation reaction. The condensation reaction is carried out in a conventional reflux reactor containing a round bottom reaction flask, a condensation column, a heated oil bath with temperature controller and an agitator either in the form of a magnetic stirrer or rotating blade. The reagents $C_6O_6 \cdot 8H_2O$ and $C_{12}H_{14}N_4$ are weighed according to the predefined ratio and placed inside of the reaction flask. Organic solvent, such as acetic acid, is subsequently added to the flask. The flask containing the reactant mixture is then immersed into the oil bath which is preheated to the designed reaction temperature in the range from about 50° C. to about 200° C. The heated reactant mixture is agitated vigorously under the constant reflux and a blanket of nitrogen flow. The reaction time ranges from about 2 hours to about 24 hours. Brownish solid is precipitated from the solution during the reaction.

The second step is filtration after the reaction is completed and cooled to ambient temperature. Typically, a Buschner funnel is used to filter the solid from the solution. After the filtration, an organic solvent, such as, but not limited to, acetic acid, is used to wash the product repeatedly until the filtered solvent becomes colorless.

The third step is drying and once the filtration is completed, the solid is be transferred to a vacuum oven and dried above ambient temperature in vacuum. The drying temperature typically ranges from about 50° C. to about 200° C.; and the time in oven ranges from about 4 to about 72 hours. The powder obtained at the end of this process can be used for hydrogen storage.

In another preferred embodiment, the preparation of poly-9,9'-spirobifluorene and its derivatives involves functionalizing the core monomer of 9,9'-spirobifluorene with acetylene terminal groups or extended acetylene terminal groups according to the reaction steps and conditions i to iv, followed by trimerization catalyzed by cobalt carbonyl as the catalyst in step v, shown in Equation 2.

Equation 2. Synthesis of poly-spirobifluorene

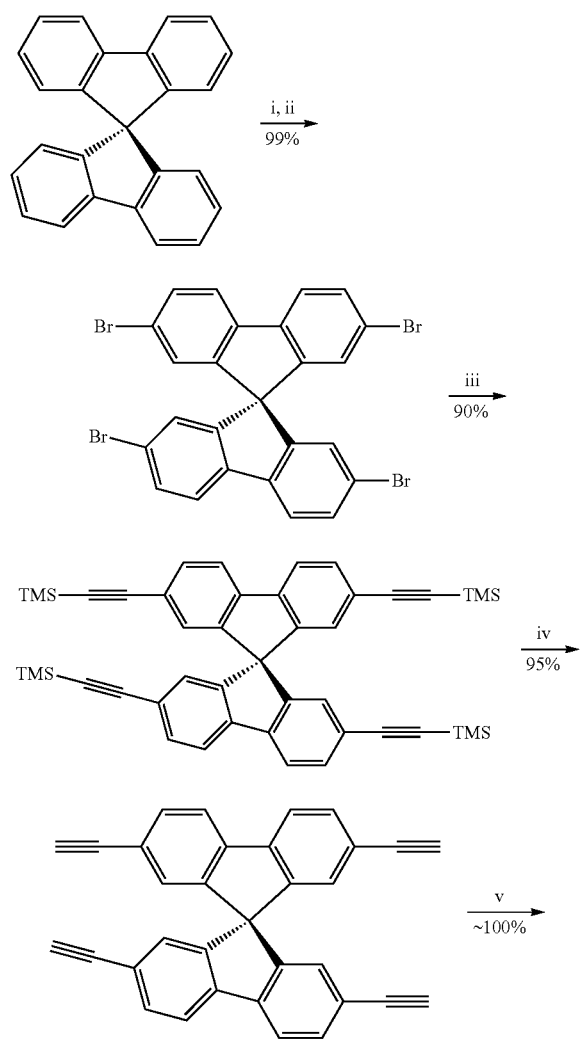

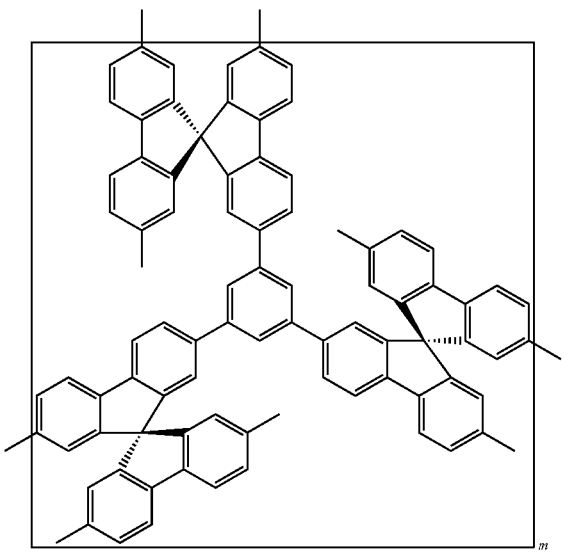

i) CHCl$_3$, Fe powder (6%mol);
ii) Br$_2$ (neat, 4.3eq) was added at 0° C., then warm to RT 3-5 h;
iii) i-Pr$_2$NH, (Trimethylsilyl)acetylene (4.8eq), PdCl$_2$(PPh$_3$) (8% mol), CuI (4%mol), PPh$_3$(16%mol), reflux for 12 h;
iv) CH$_2$Cl$_2$, NaOH (10eq) in CH$_3$OH, RT, 6 h;
v) Dioxane (dry), Co$_2$(CO)$_8$ (24%mol), 110° C., 1 h.

In yet another preferred embodiment, the preparation of poly-tetraphenyl methane and its derivatives involves functionalizing the core monomer of tetraphenyl methane with acetylene terminal groups or extended acetylene terminal groups according to the reaction steps and conditions i to iii, followed by trimerization catalyzed by cobalt carbonyl as the catalyst in step iv, shown in Equation 3.

Equation 3. Synthesis of poly-tetraphenyl methane

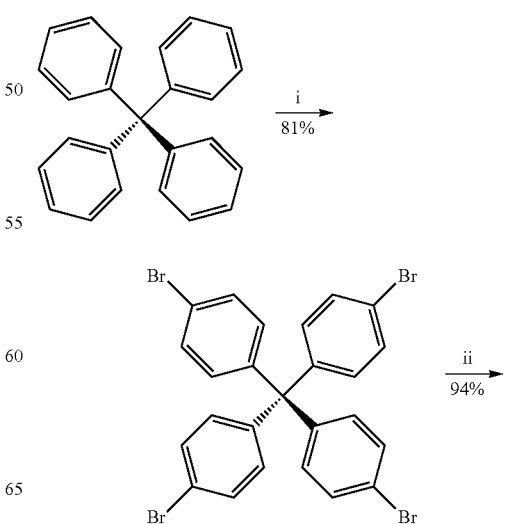

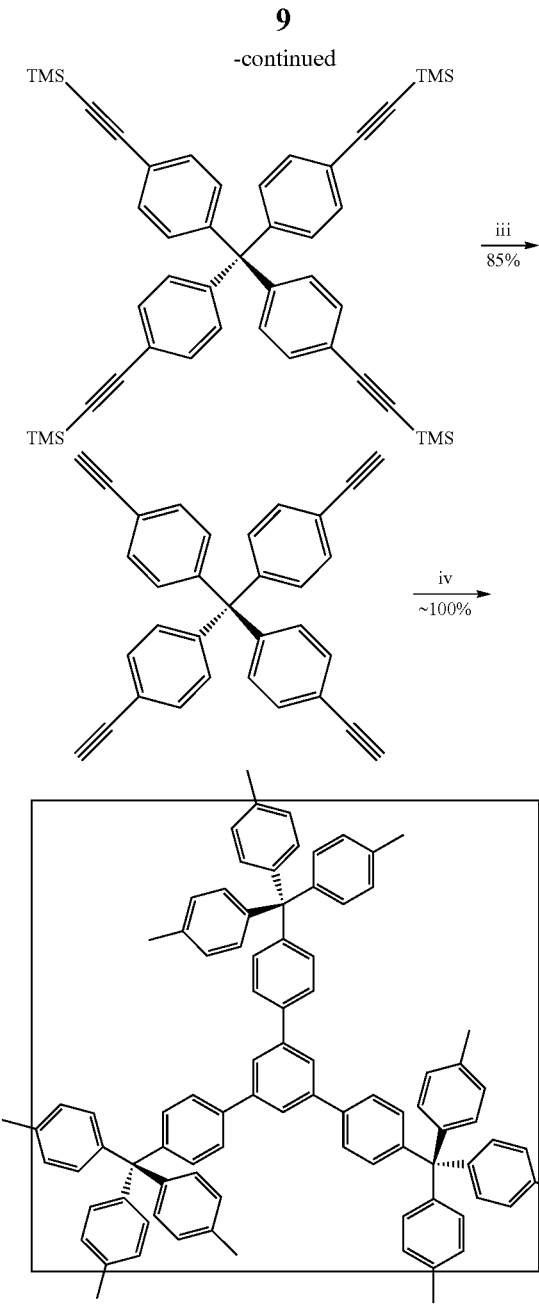

i) Br₂ (neat, 7eq) was added during 5 min period, RT, vigorous stir for 30 min;
ii) i-Pr₂NH/THF(1:3), (Trimethylsilyl)acetylene (4.8eq), PdCl₂(PPh₃) (8%mol), CuI (4%mol), PPh₃(16%mol), reflux for 24 h;
iii) CH₂Cl₂, NaOH (10eq) in CH₃OH, RT, 6 h;
iv) Dioxane (dry), Co₂(CO)₈ (24%mol), 110° C., 1 h.

In one preferred embodiment, the specific surface area and micro-porosity of tribenzohexazatriphenylene and its derivatives, poly-9,9'-spirobifluorene and its derivatives, poly-tetraphenyl methane and its derivatives can be further enhanced through oxidative activation after the polymer synthesis process. The present invention includes at least two oxidative activation approaches: supercritical water treatment and flowing $CO_2$/steam oxidation.

In another preferred embodiment, supercritical water is used, wherein polymeric powder of tribenzohexazatriphenylene or its derivatives, poly-9,9'-spirobifluorene and its derivatives, poly-tetraphenyl methane and its derivatives can be placed inside of a supercritical critical water reactor, and then mixed with high purity water such as deionized water. The reactor is then capped and the temperature and pressure are raised by an external heater to above 374° C. and 221 bar pressure, which represents the triple point of supercritical water. Under the supercritical state, the surface tension of the water disappears which substantially enhances its solubility and the penetration to the porous structure of the polymer. The incompatibility of polar solvent such as water and non-polar surface of aforementioned polymers is diminished and more effective interaction occurs at their interface under supercritical reaction condition. Because water is a weak oxidizing reagent, a supercritical temperature and pressure, $H_2O$ can react slowly with the polymer by partially oxidizing the molecular framework and functionalizing the surface through oxygenation. This will lead to substantially more openings of microscopic pores inside of polymer backbone and additional functional groups with a dipole moment, such as C=O, COH, (carbonyl, carboxyl, aldehyde, etc.), over the polymer surface. While not intended to limit the scope of the invention, it is theorized that such groups can assist the polarization of hydrogen over polymer surface to enhance van der Waals interaction thus $H_2$ adsorption capacity. Aforementioned polymers and their derivatives are still relatively rigid and stable at the supercritical temperature of water (about 374° C.), therefore supercritical critical water reactors can be used to activate these polymers without concern of significant decomposition and collapse of the polymer framework. Typically, the reaction temperature under supercritical condition should preferably be in the range of about 375° C. to about 500° C.; and the reaction time preferably should last from about 30 minutes to about 4 hours at these temperatures.

In a preferred embodiment of the invention utilizing a flowing $CO_2$/steam approach, tribenzohexazatriphenylene or its derivatives, poly-9,9'-spirobifluorene and its derivatives, poly-tetraphenyl methane and its derivatives are loaded in a packed bed configuration inside of a tubular reactor which is heated by a surrounding furnace. Carbon dioxide or $H_2O$ can be fed directly to the reactor, or mixed with a non-reactive gas diluent such as nitrogen or argon. At elevated temperature, $CO_2$ and $H_2O$ are weak oxidants. Not to be limited by the theory, the oxygen in these molecules can react with hydrocarbon material such as polymer and form functional groups with a dipole moment, such as C=O, COH, COOH, (carbonyl, carboxyl, aldehyde,), disposed over the polymer surface. In a typical activation step, the reactor temperature ranges from about 300° C. to about 750° C.; and the reaction time should last from about 30 minutes to about 4 hours at these temperatures;

EXAMPLES

The following non-limiting examples illustrate various aspects of the invention. The structure characterization of four embodiments of the polymer systems in accordance with the principles of the present invention are made and compared to various benchmark materials. Structural characterization of four embodiments of the polymer systems of the present invention (labeled NPC-1, PQ1, PD2 and PE3) were performed against carbon molecular sieve (CMS) and acid washed single walled nanotube (SWNT). Table 1 displays the surface property data from the benchmarking and FIG. 3 illustrate hydrogen storage capacity comparisons.

TABLE 1

|  | BET Surface Area (m2/g) | Micropore Surface Area (m2/g) | Total Pore Volume (cm3/g) | Micropore Volume (cm3/g) | MicroPore Diameter (nm) |
|---|---|---|---|---|---|
| CMS | 837 | 782 | 0.423 | 0.398 | 0.47 |
| SWNT | 282 | 175 | 0.329 | 0.089 | 0.53 |
| NPC-1 | 443 | 317 | 0.267 | 0.161 | 0.52 |
| PQ1 | 1043 | — | — | — | — |
| PD2 | 762 | 448 | 0.425 | 0.226 | 0.64 |
| PE3 | 971 | 443 | 0.757 | 0.223 | 0.62 |

Figure 3:
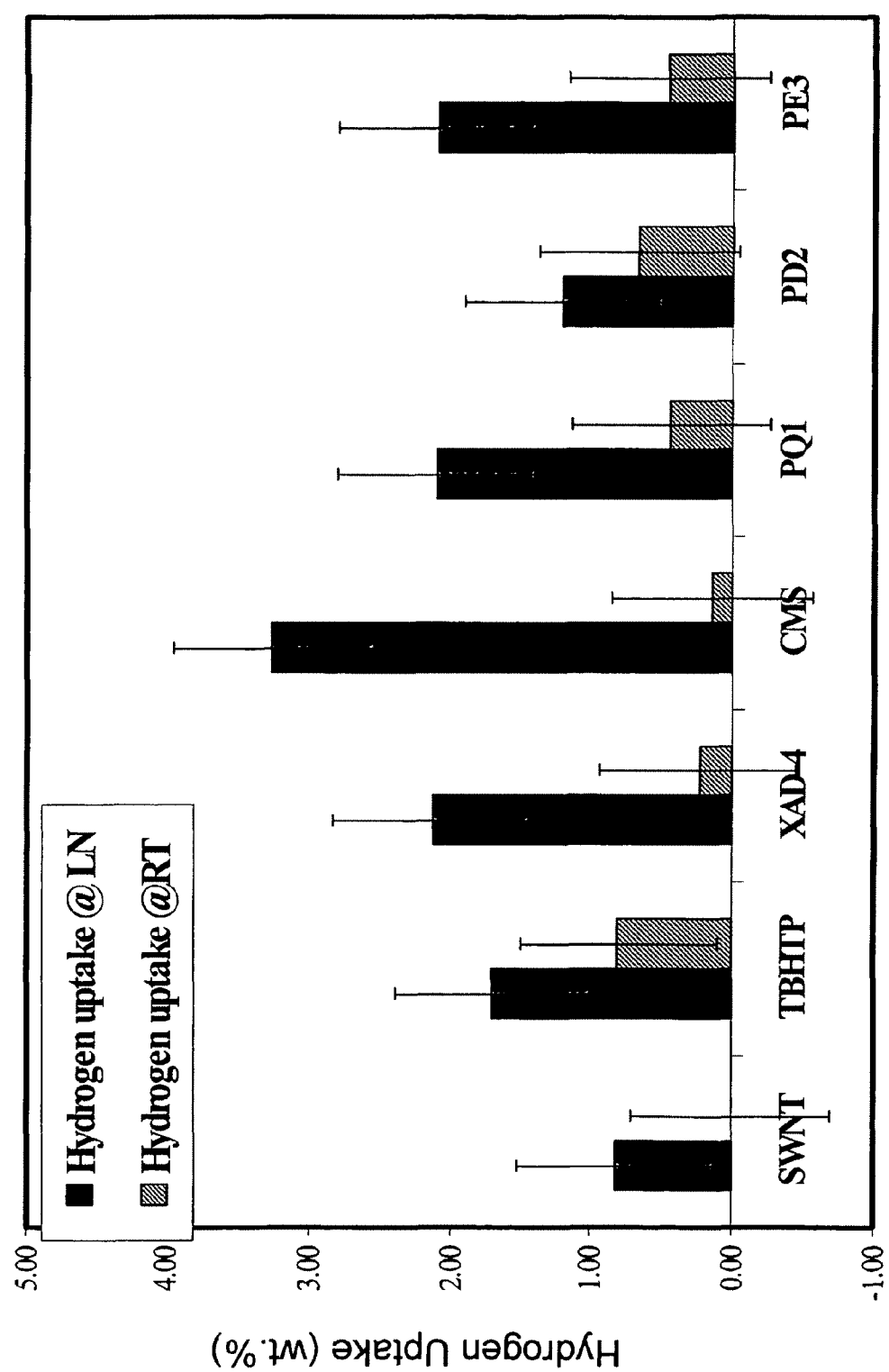
FIG. 3 is a graphical comparison of hydrogen storage capacities between tribenzohexazatriphenylene and comparative samples.

As can be seen from Table 1 and FIG. 3, relatively high surface area and narrow pore distribution were observed for the polymers NPC-1, PQ1, PD2 and PE3 materials in comparison with the benchmark samples. Furthermore, the polymer samples showed higher hydrogen uptakes at the ambient temperature.

Example 1

Figure 4:
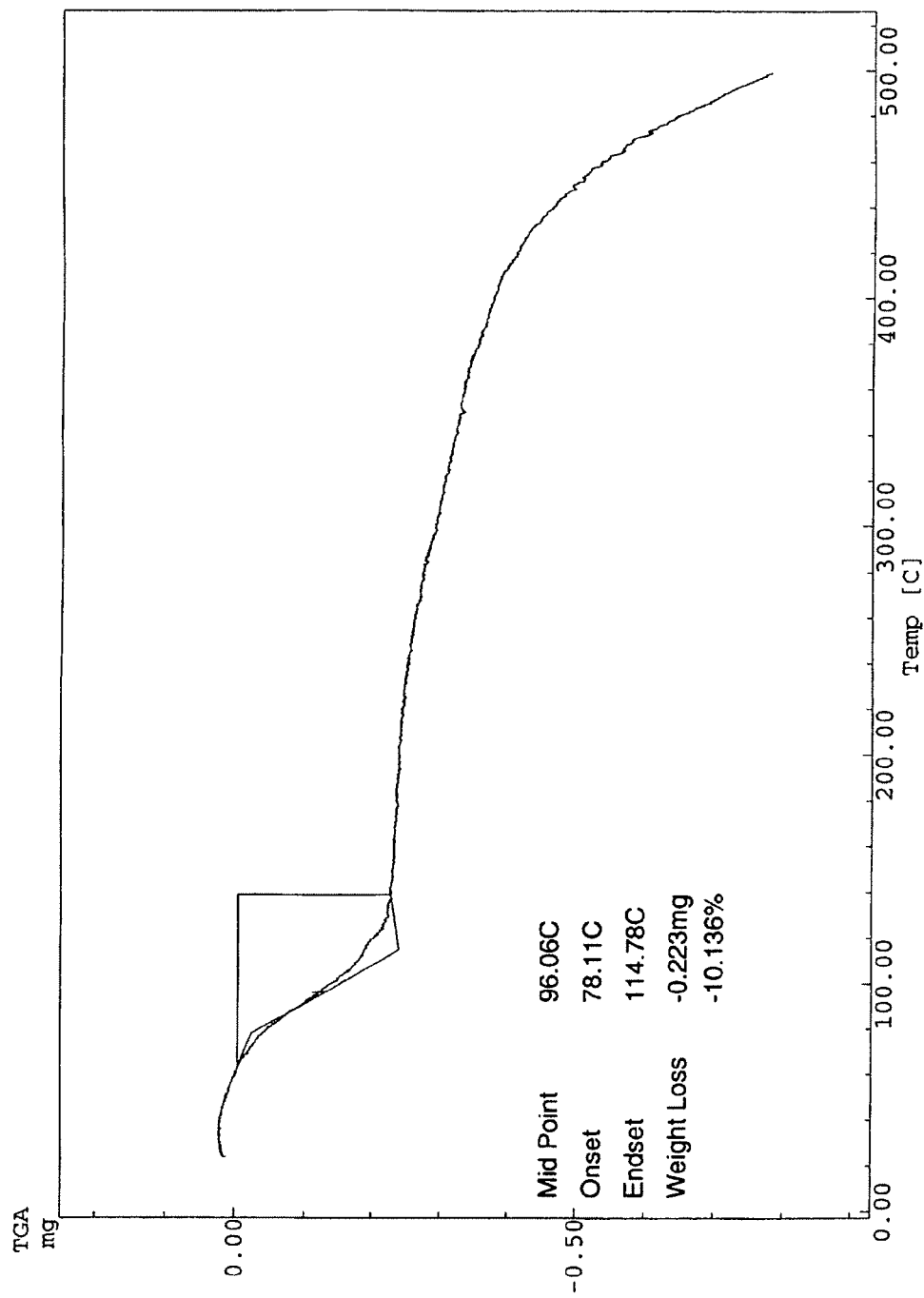
FIG. 4 illustrates a thermal gravimetric analysis on the thermal stability of tribenzohexazatriphenylene.

Synthesis of Tribenzohexazatriphenylene: Hexaketocyclohexane octahydrate (A) ($C_6O_6 \cdot 8H_2O$) (1 g, 3.2031 mmol) and 3,3'-diaminobenzidine (B) ($C_{12}H_{14}N_4$) (0.3432 g, 1.6016 mmol) has mixed in glacial acetic acid (120 mL), according to the equation (1) below. The mixture was then refluxed for 24 hours at 200° C. under the coverage of nitrogen gas blanket. After the reaction was stopped and the reactant was cooled, the mixture was filtered through a Buschner funnel. After washing away the unreacted residual, the filtered powder was dried in air and heated in a vacuum oven at 200° C. for three days. A dark brown powder was obtained at the end of the process. The following describes the reaction for the example, Thermal gravimetric analysis (TGA) identified the loss of water at about 100° C. and the polymer is stable up to nearly 400° C., as is shown by FIG. 4. Nitrogen BET study found that the polymer sample has high specific surface area of 443 $M^2/g$ and average pore diameter of 0.52 nm. The scanning electron microscopy found that large amount of "craze" formed in the polymer particle, as is shown in FIG. 1, can possibly be attributed to the high micro-porosity and surface area of the material.

Example 2

A 0.2 gram of the polymer sample prepared according to the procedure described in Example 1 was loaded inside of a sealed sample holder of a Siebert-type isotherm measurement device. The loaded sample was first evacuated at 120° C. for two hours to remove any possible volatile residues in the polymer. The hydrogen storage capacity was measured at two different temperatures, 77 K and 298 K, respectively. The former was carried out by placing the sample holder inside of a liquid nitrogen dewar, and the latter was measured after the temperature of the sample holder is completely equilibrated with the ambient. The charging pressure of equilibrium hydrogen for both measurements was kept at about 50 bars. The uptake capacities were calculated based on the difference between the observed hydrogen equilibrium pressure and that calculated in the absence of adsorption with the inclusion of volume occupation by the polymer backbone. At 77 K, the gravimetric capacity was found to be 0.017 kg $H_2/kg_{ads}$ and the volumetric capacity was found to be 0.016 kg $H_2/L$. At 298 K, the gravimetric capacity was found to be 0.008 kg $H_2/kg_{ads}$ and the volumetric capacity was found to be 0.007 kg $H_2/L$.

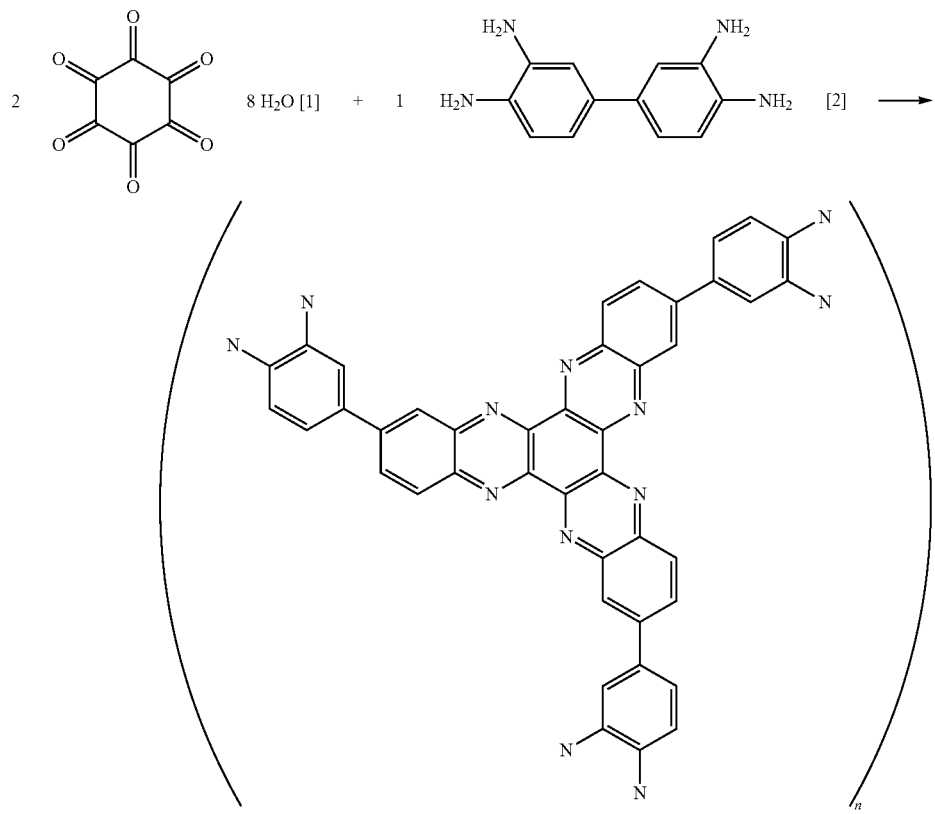

Example 3

Synthesis of a Derivative of Tribenzohexazatriphenylene: Hexaketocyclohexane octahydrate (A) ($C_6O_6 \cdot 8H_2O$) (0.6520 g, 2 mmol) and 3,3'-diaminobenzidine (B) ($C_{12}H_{14}N_4$) (0.6428 g, 3 mmol) were mixed in glacier acetic acid (120 mL). The rest of the preparation procedure followed the same as that described in Example 1. Thermal gravimetric analysis experiments showed the weight loss as the function of temperature is similar to the sample described in Example 1. Nitrogen BET study found that the polymer sample has high specific surface area of 120 $M^2/g$ and average pore diameter of 1.3 nm. The hydrogen adsorption capacity was measured in both liquid nitrogen and ambient temperatures following the same procedure as described in Example 2. The gravimetric capacity was found to be 0.01 kg $H_2$/kg$_{ads}$ at 77 K and 0.004 kg $H_2$/kg$_{ads}$ at 298 K.

Example 4

Figure 2:
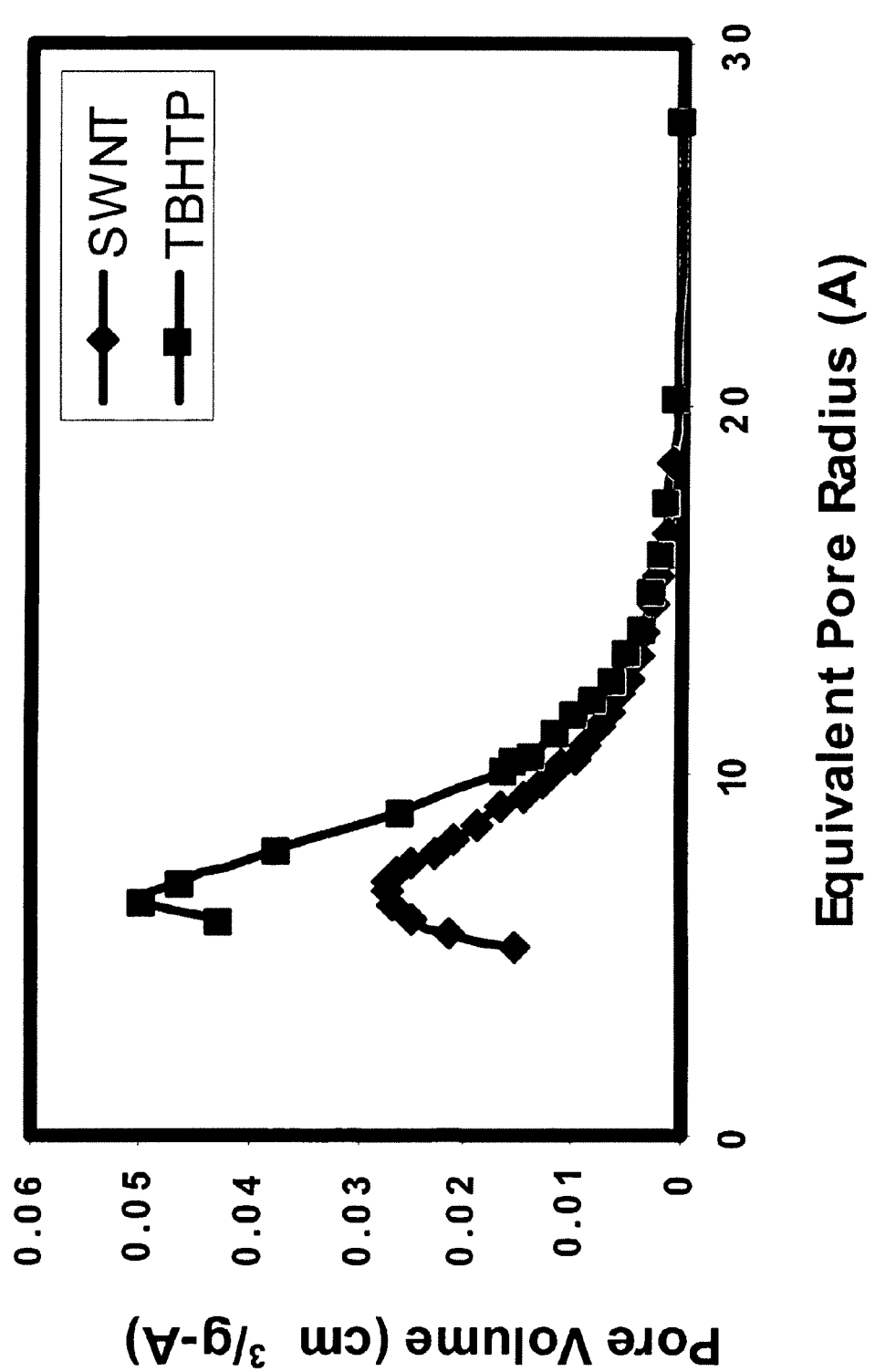
FIG. 2 is a graphical comparison of micro-pore volume distribution as a function of pore radius between tribenzohexazatriphenylene and carbon single-walled nanotubes measured by the conventional BET method.

A commercial single-walled carbon nanotube sample was acquired from Sigma-Aldrich (Carbolex AP—grade). After extensive washing with HCl acid to remove residual metals such as iron, carbon single-walled nanotubes sample was dried for surface area measurement. Nitrogen BET study found that carbon single-walled nanotubes sample has a specific surface area of 282 $M^2/g$ and average pore diameter of 0.53 nm. FIG. 2 shows the distribution of pore volume as the function of micro-pore dimension for both carbon single-walled nanotubes and tribenzohexazatriphenylene polymer prepared according to Example 1. The tribenzohexazatriphenylene sample has similar pore volume distribution to that of carbon single-walled nanotubes, but with higher volume.

Example 5

In addition to carbon single-walled nanotubes material described in Example 4, two other commercial adsorbent materials with high surface area were acquired: a carbon molecular sieve (CMS) from Honeywell International Inc. and Amberlite® (XAD-4) from Rohm & Haas. Nitrogen BET surface areas were first studied for all the samples, shown in Table 1. Hydrogen uptake measurements at both liquid nitrogen temperature and ambient temperature for these samples and the polymer sample according to preferred aspects of the current invention are shown in FIG. 3. The results indicate that the polymer samples prepared according to current invention has higher hydrogen storage capacity at the ambient temperature among all the comparative samples.

Example 6

Synthesis of Precursor for Polymer PQ1: Fe powder (0.075 g, 1.33 mmol) was added to a solution of 9,9'-spirobifluorene (7.0 g, 22.1 mmol) in 33 mL of chloroform, the mixture was then cooled to 0° C., then neat bromine (4.9 mL, 95.03 mmol) was added slowly via a syringe. The mixture was stirred at 0° C. for 1 h, then warmed to room temperature, continued stirring for another 3-5 h, and the evolved HBr gas was exported to a NaOH solution. The reaction mixture was then poured into saturated $Na_2CO_3$ solution to remove the excess $Br_2$, and extracted with $CH_2Cl_2$ twice. The combined organic phase was washed with brine once, separated and dried over anhydrous Na2SO4. After removing the solvent, white solid product (14.0 g, 99% yield) was obtained in its pure form. Further purification could be done by crystallization from $CHCl_3$/EtOH mixture. $^1H$ NMR: δ (ppm): 6.82 (d, J=1.6 Hz, 4H, Ar—H), 7.54 (dd, J=1.8, 8.2 Hz, 4H, Ar—H), 7.68 (d, J=8.2 Hz, 4H, Ar—H), the result indicates the product is 2,2',7,7'-tetrabromo-9,9'-spirobifluorene 2,2',7,7'-tetrabromo-9,9'-spirobifluorene (3.0 g, 4.75 mmol), $PdCl_2(PPh_3)_2$ (0.26 g, 0.37 mmol), CuI (0.036 g, 0.19 mmol) and $PPh_3$ (0.2 g, 0.76 mmol) were placed in a round bottom flask, anhydrous i-$Pr_2NH$ (50 mL) and trimethylsilyl acetylene (3.24 mL, 22.8 mmol) was added via a syringe. The reaction mixture was brought to reflux overnight then cooled down to room temperature. Solvent was removed in vacuum, and $CHCl_3$ was added to dissolve the residue, and filtered through a pad of celite. The filtrate was washed with dilute $Na_2EDTA$ solution, and then dried over anhydrous $Na_2SO_4$, the solution was concentrated and ethanol was added to obtain white solid product (3.0 g, 90% yield) in its pure form. $^1H$ NMR: δ (ppm): 0.16 (s, 36H, $CH_3$), 6.77 (d, J=0.8 Hz, 4H, Ar—H), 7.49 (dd, J=1.4, 7.9 Hz, 4H, Ar—H), 7.74 (d, J=7.9 Hz, 4H, Ar—H). 13C NMR: δ (ppm): 0.4, 96.1, 106.0, 121.4, 124.0, 128.9, 133.4, 142.5, 149.2. The result indicates the product is 2,2',7,7'-tetra(2-(trimethylsilyl)ethynyl)-9,9'-spirobifluorene.

NaOH (0.286 g, 7.1 mmol) was dissolved in 5 mL $CH_3OH$, then add to a solution of 2,2',7,7'-tetra(trimethylsilyl acetyl)-9,9'-spirobifluorene (0.5 g, 0.71 mmol) in 20 ml $CH_2Cl_2$, then stirred for 6 h at room temperature. The reaction mixture was washed with water, and the aqueous phase was extracted with $CH_2Cl_2$ once, the combined organic phase was washed with brine, and then dried over anhydrous $Na_2SO_4$. The solution was concentrated and ethanol was added to the solution. Light yellow solid product (0.273 g, 95% yield) was obtained in its pure form. $^1H$ NMR: δ (ppm): 3.01 (s, 4H, C≡CH), 6.866 (d, J=0.8 Hz, 4H, Ar—H), 7.54 (dd, J=1.4, 7.9 Hz, 4H, Ar—H), 7.80 (d, J=7.9 Hz, 4H, Ar—H). The result indicates the product is 2,2',7,7'-tetraethynyl-9,9'-spirobifluorene.

Example 7

Synthesis of Polymer PQ1: 2,2',7,7'-tetraethynyl-9,9'-spirobifluorene (0.611 g, 1.48 mmol) obtained from Example 6 was charged into a flame-dried round bottom flask, anhydrous dioxane 15 mL was added via a syringe, stirred to get clear light yellow solution. $CO_2(CO)_8$ (0.338 g, 0.988 mmol) was added under protection of $N_2$, keep stirring for awhile, then the flask was placed into an oil bath that was pre-heated to 115° C. The brown solution started to solidify after about 5 minutes. Continued heating was done for the reaction mixture for another 55 minutes, then the flask was lifted above the oil bath to cool to room temperature. The brown solid was smashed to fine particles using a spatula, then washed with methanol, and filtered to collect the solid. After an air dry for an hour, the solid was stirred into 40 mL 37% HCl solution for 2 h at room temperature. The resulted mixture was filtered, washed with water and methanol, and dried in vacuum oven at 90° C. for 2 days. About 0.65 g (~100% yield, containing some catalyst) of brown solid was obtained, which is labeled at polymer PQ1.

Example 8

Figure 6:
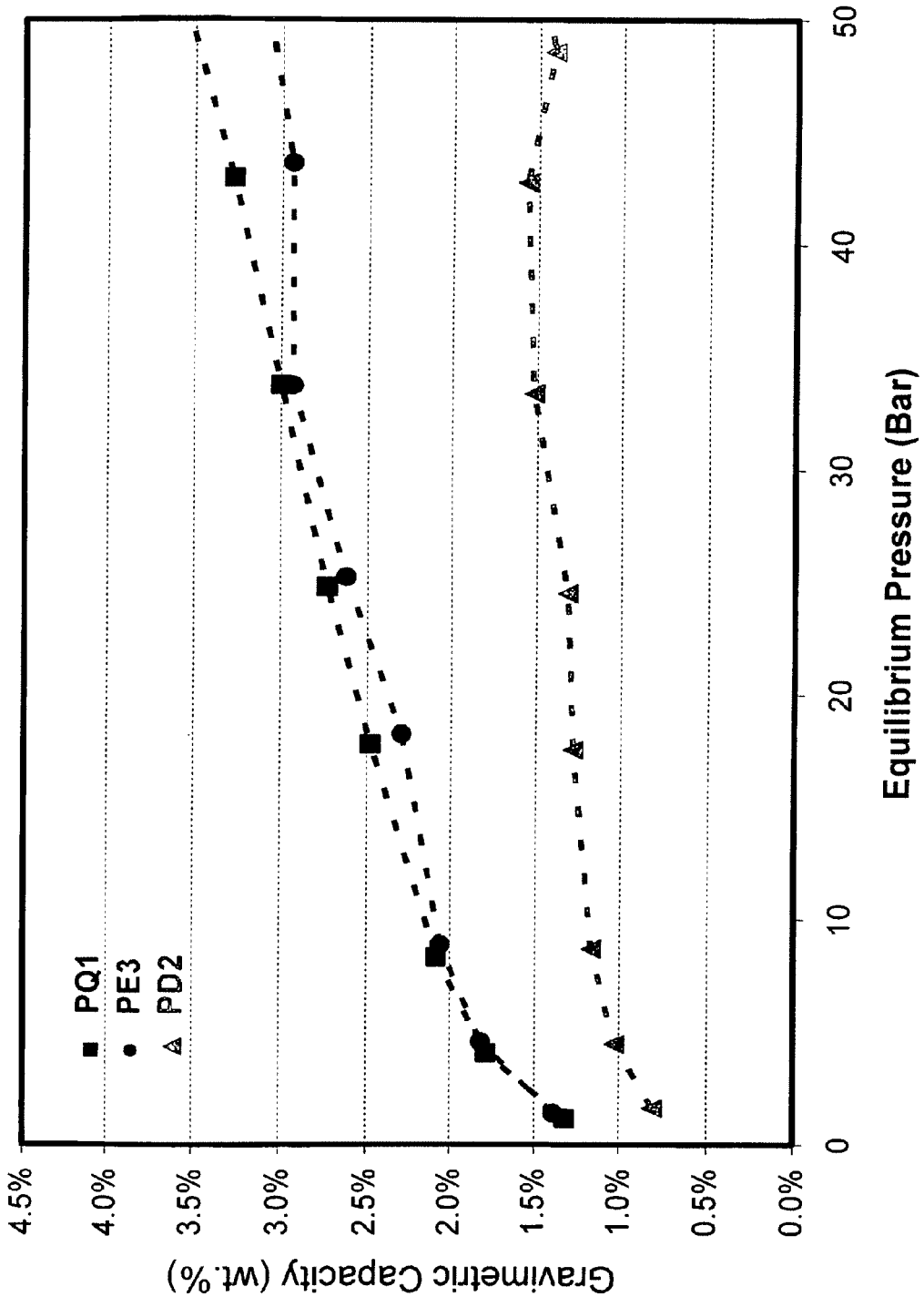
FIG. 6 illustrates gravimetric hydrogen adsorption capacities of polymer PQ1 PE3 and PD2 as the function of hydrogen equilibrium pressure at 77K.

A 0.36 gram of the polymer sample PQ1 prepared according to the procedure described in Example 6 was loaded inside of a sealed sample holder of a Siebert-type isotherm measurement device. Following the same measurement procedure as described in Example 2, a gravimetric hydrogen uptake capacity of 0.021 kg $H_2$/kg$_{ads}$ at 10 bars at 77 K and 0.0043 kg $H_2$/kg$_{ads}$ at 70 bars at 298 K was observed. The change of the gravimetric capacity (in the unit of weight percent) as the function of hydrogen equilibrium pressure at 77 K is shown in FIG. 6.

Example 9

Synthesis of Precursor of Polymer PD2: Tetra(4-bromophenyl)methane (4.02 g, 6.33 mmol), $PdCl_2(PPh_3)_2$ (0.266 g, 0.37 mmol), CuI (0.048 g, 0.25 mmol) and $PPh_3$ (0.2 g, 0.76 mmol) were placed in a round bottom flask, anhydrous i-$Pr_2NH$ (50 mL) or a mixture of anhydrous i-$Pr_2NH$/THF (15 mL/45 mL) and trimethylsilyl acetylene (4.3 mL, 30.36 mmol) was added via a syringe. The reaction mixture was brought to reflux for 24 h then cooled down to room temperature. Solvent was removed in vacuum, and $CHCl_3$ was added to dissolve the residue, and filtered through a pad of celite. The filtrate was washed with dilute $Na_2$EDTA solution, and then dried over anhydrous $Na_2SO_4$, the solution was concentrated and ethanol was added to obtain white solid product (4.2 g, 94% yield) in its pure form. $^1H$ NMR: δ (ppm): 0.23 (s, 36H, $CH_3$), 7.04 (d, J=8.5 Hz, 8H, Ar—H), 7.33 (d, J=8.5 Hz, 8H, Ar—H). The result indicates the product is tetra(4-(2-(trimethylsilyl)ethynyl)phenyl)methane. Follow the procedure to the synthesis of 2,2',7,7'-tetraethynyl-9,9'-spirobifluorene described in Example 6, light yellow product was obtained in 85% yield. $^1H$ NMR: δ (ppm): 3.06 (s, 4H, C≡CH), 7.12 (d, J=8.6 Hz, 8H, Ar—H), 7.39 (d, J=8.6 Hz, 8H, Ar—H). The result indicates the product is tetra(4-ethynylphenyl)methane.

Example 10

Synthesis of Polymer PD2: The precursors prepared according to Example 9 were used to prepare PD2, following the same procedure described according to Example 7. A brown solid was obtained in about 100% yield at the end of the reaction, which is labeled as polymer PD2.

Example 11

A 0.19 gram of the polymer sample PD2 prepared according to the procedure described in Example 10 was loaded inside of a sealed sample holder of a Siebert-type isotherm measurement device. Following the same measurement procedure as described in Example 2, a gravimetric hydrogen uptake capacity of 0.012 kg $H_2$/kg$_{ads}$ at 10 bars at 77 K and 0.0066 kg $H_2$/kg$_{ads}$ at 70 bars at 298 K was observed. The change of the gravimetric capacity (in the unit of weight percent) as the function of hydrogen equilibrium pressure at 77 K is shown in FIG. 6.

Example 12

Synthesis of Precursor of Polymer PE3: 2,2',7,7'-tetrabromo-9,9'-spirobifluorene (1.99 g, 3.15 mmol), 2-(tributylstannyl)thiophene (9.4 g, 25.19 mmol), and $Pd(PPh_3)_4$ (0.146 g, 0.126 mmol) was added to a flame-dried 2-neck flask under nitrogen protection. 60 mL of anhydrous THF was then added and degassed by bubbling nitrogen gas for 15 minutes. The reaction mixture was refluxed for 24 h, and then cooled down to room temperature. THF solvent was removed and the brown-yellow solid was purified by flash chromatography on silica gel column using hexane:$CH_2Cl_2$ (1:1) as eluent. The fluorescent band was collected and concentrated to yield brown yellow solid, recrystallization from $CHCl_3$/EtOH give 1.79 g pure product (88.1% yield). $^1H$ NMR: δ (ppm): 6.95 (dd, J=5.0 Hz, 3.7 Hz, 4H, Th—H), 6.99 (d, J=1.5 Hz, 4H, Ar—H), 7.15 (m, 8H, Th—H), 7.66 (dd, J=8.0 Hz, 1.6 Hz, 4H, Ar—H), 7.87 (d, J=8.0 Hz, 4H, Ar—H). The result indicates the product is 2,2',7,7'-Tetrakis-(2-thieny)-9,9'-spirobifluoene.

Example 13

Figure 5:
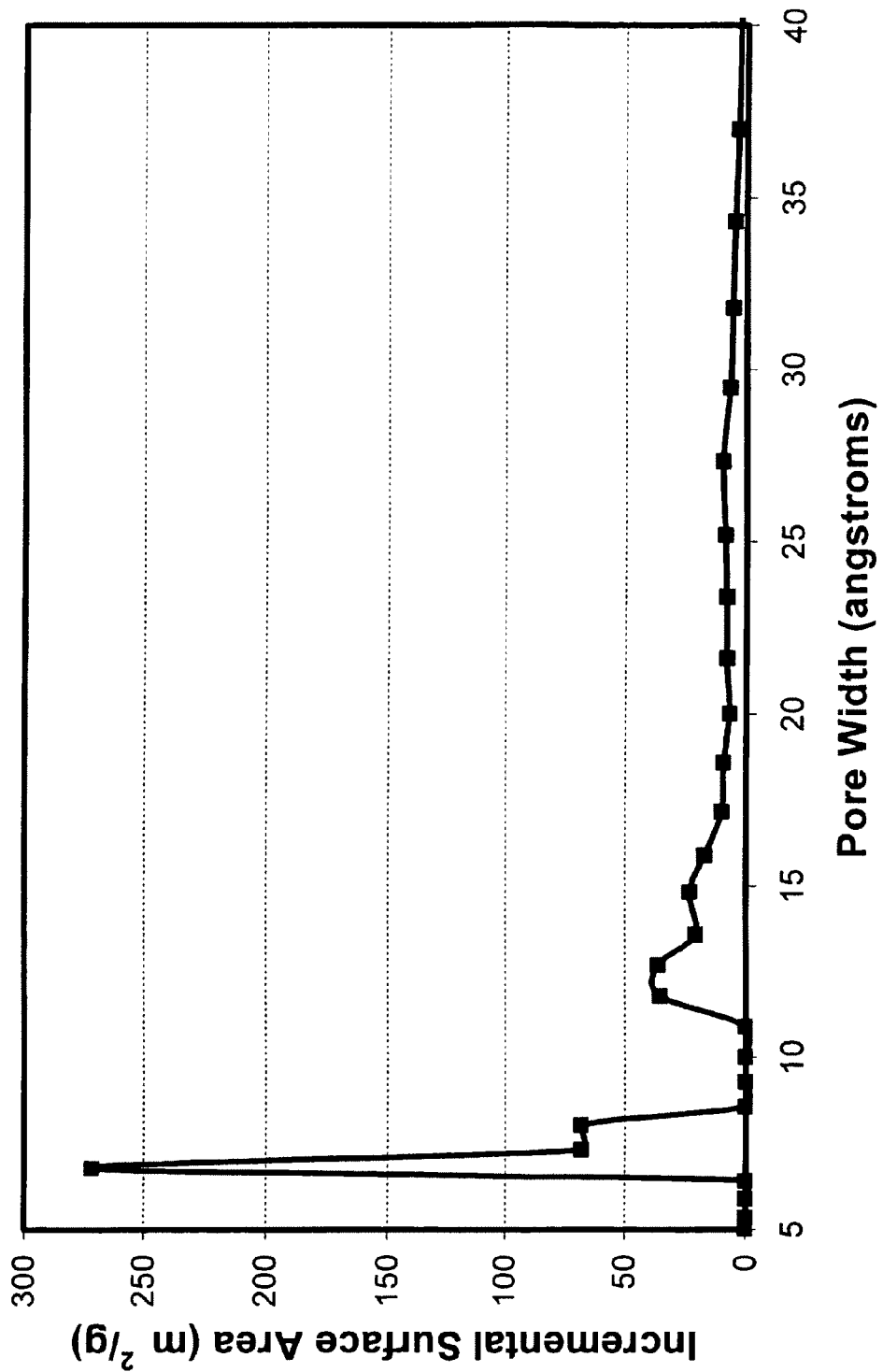
FIG. 5 illustrates the incremental surface area of polymer PE3 as the function of pore width.

Synthesis of Polymer PE3: 2,2',7,7'-Tetrakis-(2-thieny)-9,9'-spirobifluoene (0.645 g, 1.0 mmol) was dissolved in 50 ml anhydrous $CHCl_3$, then transferred dropwise to a suspension of $FeCl_3$ (1.3 g, 8.0 mmol) in 15 ml anhydrous $CHCl_3$, the resulted mixture was stirred at room temperature overnight. 200 ml MeOH was then added to the above reaction mixture and kept stirring for another hour. The precipitation product was collected by filtration and washed with MeOH and allowed to dry in air. The light brown solid was stirred into 37% HCl solution for 2 hours, the suspension was then filtered and washed with $H_2O$ and MeOH. After extracting with $CH_2Cl_2$ in a Soxlet extractor for 24 hours, the product was dried in vacuum oven at 100° C. overnight. Yield was about 99%. The product is labeled as polymer PE3. In addition to the high surface area given by Table 1, a significant fraction of the pore formed during the synthesis has narrow diameter near 6 Å, as shown by the incremental surface area distribution plot in FIG. 5 which is derived from the density function theory calculation base on the BET analysis.

Example 14

A 0.24 gram of the polymer sample PE3 prepared according to the procedure described in Example 14 was loaded inside of a sealed sample holder of a Siebert-type isotherm measurement device. Following the same measurement procedure as described in Example 2, a gravimetric hydrogen uptake capacity of 0.021 kg $H_2$/kg$_{ads}$ at 10 bars at 77 K and 0.0045 kg $H_2$/kg$_{ads}$ at 70 bars at 298 K was observed. The change of the gravimetric capacity (in the unit of weight percent) as a function of hydrogen equilibrium pressure at 77 K is shown in FIG. 6.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A hydrogen storage system including an organic polymer product, characterized by the improvement that the organic polymer comprises a porous polymer prepared by cross-linking of a plurality of a stereo-contorted core monomer component having a structure selected from the group of a spiral core structure and tetrahedral core structure and forming a benzene ring from the plurality of the cross-linked stereo-contorted core monomer component.

2. The hydrogen storage system as defined in claim 1, wherein the stereo-contoured core monomer component is selected from the group consisting of 9,9'-spirobifluorene and tetraphenyl methane and functionalized derivatives thereof having a terminal group selected from the group of acetylene, ethynnylphenyl and thienyl.

3. A hydrogen storage system including an organic polymer product, characterized by the improvement that the organic polymer comprises a porous polymer prepared by cross-linking of a plurality of a stereo-contorted core monomer component having a structure selected from the group of a spiral core structure and tetrahedral core structure and further including functionalized forms of the monomer component comprised of a terminal group selected from a group consisting of acetylene, ethynylphenyl and thienyl.

4. The hydrogen storage system as defined in claim 1, wherein the polymer is prepared by cross-linking of monomers selected from the group consisting of 2,2',7,7'-tetraethynyl-9,9'-spirobifluorene, tetra(4-ethynylphenyl)methane, 2,2',7,7'-Tetrakis-(2-thieny)-9,9'-spirobifluoene.

5. A hydrogen storage system including an organic polymer, characterized by the improvement in that the organic polymer comprises a porous polymer prepared by cross-linking of a stereo-contorted core monomer having a structure selected from the group of a spiral core structure and tetrahedral core structure wherein the stereo-contorted core monomer component comprises functionalized groups including at least one of acetylene terminal groups and extended acetylene terminal groups.

6. The hydrogen storage system as defined in claim 5 wherein the stereo-contorted core monomer component is selected from the group of poly 9,9'-spirobifluorene, tetraphenyl methane and functionalized derivatives thereof having a terminal group selected from the group of acetylene, ethynylphenyl and thienyl.

7. The hydrogen storage system as defined in claim 6 wherein the functionalization of the stereo-contorted core monomer component is accomplished by reaction steps i-iii where step i comprises a bromination reaction through which Br is attached to a contorted core monomer; step ii comprises a coupling reaction between said Br in the step i and components selected from the group of (trimethylsilyl)acetylene, 4-(trimethylsilylethynyl)phenyl boronic acid, or 2-tributyltin thiophene), where the Br is replaced by R(R=trimethylsilyethynyl, 4-(trimethylsilylethynyl)phenylene, and thienyl; and step iii comprises removal of the trimethylsilyl component.

8. The hydrogen storage system as defined in claim 1 wherein the polymer is processed by a step of stabilizing the stereo-contoured core monomer component by temperature cycling treatments.

9. The hydrogen storage system as defined in claim 8 wherein the polymer is processed by a flowing $CO_2$/steam source.

10. The hydrogen storage system as defined in claim 9 wherein the flowing $CO_2$/steam source process includes loading the polymer in a packed bed configuration in a reactor and heated by a furnace.

11. The hydrogen storage system as defined in claim 9 wherein the $CO_2$/steam source is selected from the group of a flowing $CO_2/H_2O$ fed directly to the reactor and a mixture of $CO_2/H_2O$ with a non-reactive gas diluent.

12. The hydrogen storage system as defined in claim 1 wherein the polymer is processed by placing the polymer in a supercritical water reactor, mixed the polymer with high purity water, closing the reactor, and increasing temperature and pressure in the reactor above water's triple point of supercriticality.

13. The hydrogen storage system as defined in claim 12 where the temperature ranges between about 375° to 500° C.

14. The hydrogen storage system as defined in claim 12 wherein the pressure is above about 221 bar.

15. The hydrogen storage system as defined in claim 12 wherein time at the temperature is about 30 minutes to 4 hours.

16. The hydrogen storage system as defined in claim 1 wherein the porous polymer includes pores having a diameter of about 0.3 nm to 1.0 nm.

17. The hydrogen storage system as defined in claim 2 wherein the functionalized derivatives are selected from the group of 2,2',7,7-tetraethynyl-9,9-spirobifluorene, tetra(4-ethynylphenyl)methane, 2,2',7,7'-Tetrakis-(2-thieny)-9,9'-spirobifluoene.

18. The hydrogen storage system as defined in claim 3 wherein a homo-coupling reaction is used to prepare the polymer from the monomer component containing thieny functional group.

* * * * *